United States Patent [19]
Kikuchi

[11] Patent Number: 6,088,733
[45] Date of Patent: Jul. 11, 2000

[54] COMMUNICATIONS OF MIDI AND OTHER DATA

[75] Inventor: Takeshi Kikuchi, Hamamatsu, Japan

[73] Assignee: Yamaha Corporation, Hamamatsu, Japan

[21] Appl. No.: 09/079,672

[22] Filed: May 15, 1998

[30] Foreign Application Priority Data

May 22, 1997 [JP] Japan ..................................... 9-148670

[51] Int. Cl.[7] .................................................... G06F 13/00
[52] U.S. Cl. ......................................................... 709/231
[58] Field of Search ...................... 364/DIG. 1 MS File, 364/DIG. 2 MS File; 84/645, 622; 709/200, 231

[56] References Cited

U.S. PATENT DOCUMENTS 5,056,402  10/1991  Hikawa et al. ........................... 84/645
5,734,119  3/1998   France et al. ............................. 84/622
5,831,192  11/1998  Watari et al. ............................. 84/622

FOREIGN PATENT DOCUMENTS

| 4-18835 | 1/1992 | Japan . |
| 4-40133 | 2/1992 | Japan . |
| 4-72973 | 3/1992 | Japan . |
| 6-295269 | 10/1994 | Japan . |

*Primary Examiner*—Robert B. Harrell
*Attorney, Agent, or Firm*—Graham & James LLP

[57] ABSTRACT

In addition to MIDI format performance data of MIDI instruments, various other data such as image data (performance scene), voice data (vocal and data of musical instruments other than MIDI instruments) and associated data, is changed to MIDI events which are transmitted with the MIDI format performance data, as MIDI data. At a reception terminal, the MIDI data including the MIDI format performance data and sound/image data is reproduced in accordance with the MIDI specification.

25 Claims, 6 Drawing Sheets

COMMUNICATIONS OF MIDI AND OTHER DATA

This application is based on Japanese patent application No. HEI-9-148670 filed on May 22, 1997, the entire contents of which are incorporated herein by reference.

BACKGROUND OF THE INVENTION a) Field of the Invention

The present invention relates to data communications technologies for transmitting/receiving, via a network, musical performance data of electronic musical instruments and audio and visual data.

b) Description of the Related Art

As a standard specification for interconnection between electronic musical instruments and between electronic musical instruments and tone generators, a musical instrument digital interface (MIDI) is known. So-called Internet concerts are also known. MIDI performance data output from electronic musical instruments played by players in a concert hall is distributed in the Internet and reproduced by a computer or MIDI instruments in each home as a reception terminal. In some of Internet concerts, in addition to MIDI performance data, other data such as image data (still and moving images) showing performance scenes of players or audiences in the concert hall and audio data (live sounds) are also distributed to the Internet. Each person can listen to the performance as if players are playing in his or her home.

MIDI data of an Internet concert is input and distributed to the network, independently from sound/image data. Therefore, in some case, sound/image data is reproduced at each home asynchronously with MIDI data. For example, during reproduction at each home, an image of a player depressing a key is displayed on a monitor after the sound of received MIDI data is reproduced, or musical tones of MIDI data generated by musical instruments are reproduced asynchronously with vocal sounds of sound data generated by microphones.

SUMMARY OF THE INVENTION

It is an object of the present invention to provide technologies of distributing performance data and sound/image data to a network and reproducing at a reception terminal the performance data and scenes of a concert hall (sounds and images), in which performance data by players and sound/image data can be reproduced synchronously.

According to one aspect of the present invention, there is provided a communication apparatus comprising: first input means for inputting first MIDI data in conformity with a MIDI specification; second input means for inputting other data not in conformity with the MIDI specification; converting means for converting the other data input from the second input means into second MIDI data in conformity with the MIDI specification; and transmitting means for transmitting the first and second MIDI data.

According to another aspect of the present invention, there is provided a data communication method for a communication system in which MIDI format performance data of MIDI instruments played by players as well as various other related data including image data, sound data, and associated data is distributed to a network from a transmission terminal to reception terminals whereat the data is reproduced, the data communication method comprising the steps of: changing at the transmission terminal the various other related data including the image data, sound data and associated data to MIDI events, generating MIDI data of the MIDI format performance data and the various other related data, and distributing the MIDI data to the network; receiving at the reception terminal the MIDI data distributed via the network; and sequentially deriving from the received MIDI data the MIDI format performance data and the various other related data changed to the MIDI events and reproducing the derived data.

According to another aspect of the present invention, there is provided a data communication method for a communication system in which MIDI format performance data of MIDI instruments played by players as well as various other related data including image data, sound data, and associated data is distributed to a network from a transmission terminal to reception terminals whereat the data is reproduced, the data communication method comprising the steps of: changing at the transmission terminal the various other related data including the image data, sound data and associated data to MIDI events, generating MIDI data of the MIDI format performance data and the various other related data, and forming a packet containing the MIDI data, respectively at a predetermined time interval; distributing the packet generated at the predetermined time interval to the network; receiving at the reception terminal the packet distributed via the network; and sequentially deriving from the MIDI events in the received packet the MIDI format performance data and the various other related data changed to the MIDI events and reproducing the derived data.

In a system in which performance data, image data, sound data and the like are distributed to a network to reproduce at each reception terminal the performance data and concert hall scenes from the received data, at the transmission terminal the various other related data including the image data, sound data and associated data is changed to MIDI events, and MIDI data of the MIDI format performance data and the various other related data is distributed to the network, and at the reception terminal the MIDI data is reproduced in accordance with the MIDI specification. In a network concert on the Internet or the like, therefore, the MIDI performance data can be transmitted to the reception terminal synchronously with the sound data of vocal and musical instruments other than MIDI instruments, and with the image data such as performance scenes. Furthermore, since the MIDI performance data and other various related data of the network concert are transmitted as the MIDI data, the received MIDI data can be stored by using a MIDI filer and reproduced at a later time. Since the MIDI performance data is stored not in the form of sound data but in the form of MIDI data, the data amount to be stored can be reduced.

DETAILED DESCRIPTION OF THE PREFERRED EMBODIMENTS

Figure 1:
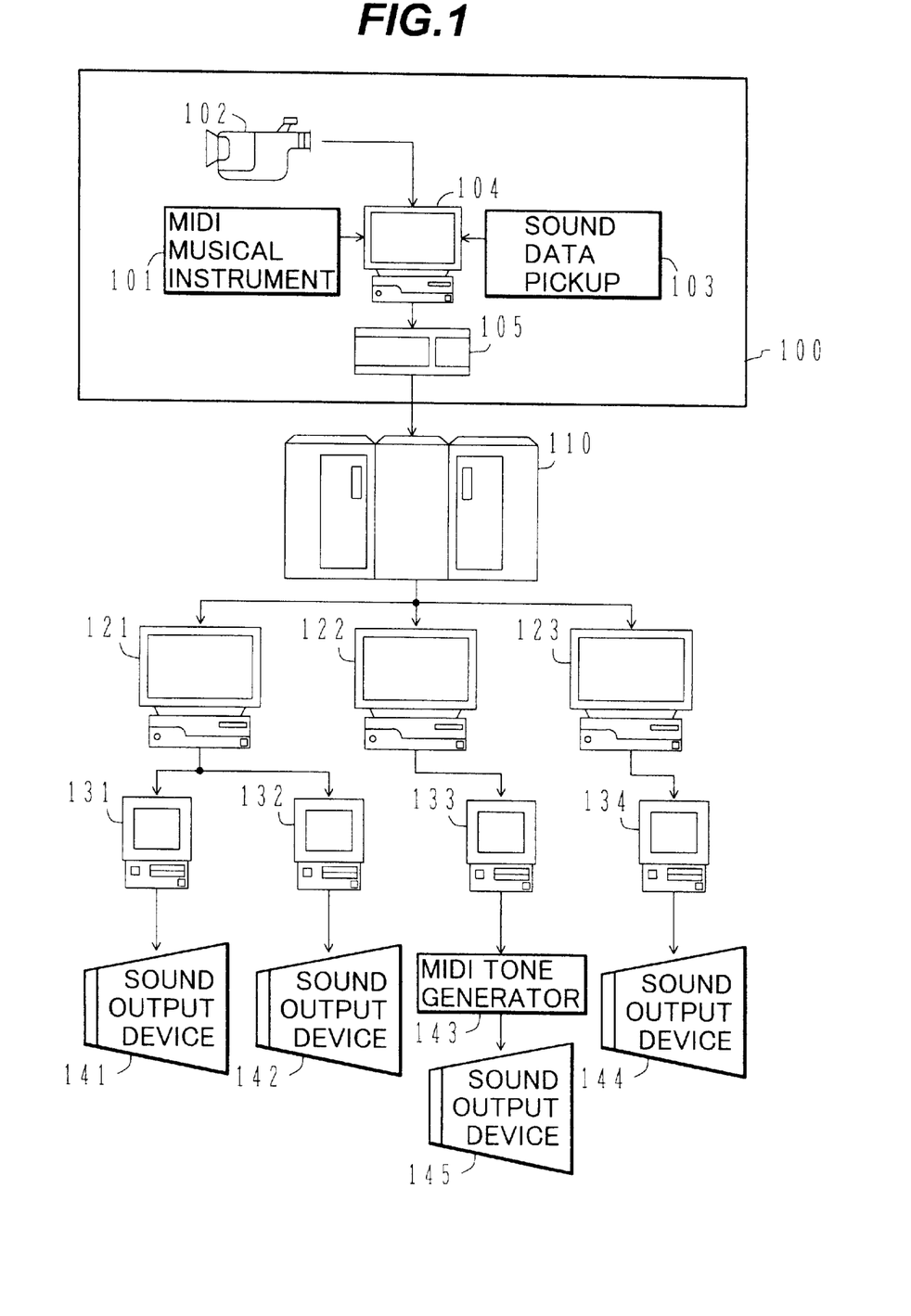
FIG. 1 is a hierarchical diagram showing a data communications system according to an embodiment of the present invention.

FIG. 1 is a hierarchical diagram showing a data communications system according to an embodiment of the present invention. This system is one example of an Internet concert described in the section "Description of the Related Art".

A concert hall 100 is installed with a MIDI musical instrument 101, a camera 102, and a sound pickup unit 103. A player plays the MIDI musical instrument 101 in the concert hall 100. The camera 102 takes the images (still and moving images) of a player and concert hall including audiences. The sound pickup unit 103 picks up vocal sounds and sounds of natural musical instruments other than MIDI instruments, and is a microphone for example. MIDI data (hereinafter called MIDI part data) output from the MIDI instrument 101, image data output from the camera 102, and sound data output from the sound pickup unit 103 are all input to an encoder 104 which constitutes a transmission terminal. The sound data pickup unit 103 or encoder 104 has an A/D converter for converting analog sound data into digital sound data. The encoder 104 forms a packet of input data shown in FIG. 2 to be described later, in accordance with a process routine shown in FIG. 4 to be described later. The packet is transmitted via a rooter 105 to an external main frame 110.

The main frame 110 transmits the packet to world wide web (WWW) servers 121, 122 and 123 of the network. Each WWW server 121–123 is a server at an Internet provider.

A user can access the Internet concert by connecting its home computer 131–134 to the WWW server 131–134 at each provider. The home computer 131–134 is pre-installed with a program for using it as a reception terminal of the Internet concert, and runs on this program. The detailed operation of this program will be given later with reference to FIG. 5. With this program, data transmitted from the WWW server 121–123 is received and the time and order of reproducing the data is managed. MIDI part data is supplied to and reproduced by a MIDI tone generator module (e.g., a MIDI tone generator 143 connected to the home computer 133 shown in FIG. 1). Image data is supplied to an image control module (e.g., a monitor of each home computer 131–134 shown in FIG. 1) to display it. Sound data is supplied to a sound control module (e.g., a sound output unit 141, 142, 144, 145 shown in FIG. 1) to reproduce sounds. Sounds and images in the concert hall can be reproduced in real time at each home. The sound output unit 141, 142, 144, 145 or home computer 131–134 has a D/A converter for converting digital sound data into analog sound data. The sound output unit 141, 142, 144, 145 has an amplifier and speaker.

In the communications system of this embodiment, each event of image and sound data is changed to a MIDI event by the encoder 104 at the transmission terminal when the event occurs. Namely, the sound/image event is described by exclusive data which is an extended format of MIDI data, and distributed to the network as the MIDI data similar to the MIDI part data. The exclusive data (exclusive message) is in conformity with the MIDI specification and its status byte is "F0" in hexadecimal notation. Between the exclusive start code "F0" and an exclusive end code "F7", the sound/image data is inserted. Although the sound/image data per se does not satisfy the MIDI specification, if it is described by exclusive data, it can have the data format in conformity with the MIDI specification.

Upon reception of MIDI data including MIDI part data and sound/image data, each reception terminal 131–134 reproduces it as MIDI events so that they can be reproduced synchronously. Each sequencer of the reception terminal 131–134 can adjust the timings of reproducing the MIDI data including MIDI part data and sound/image data, in the unit of bar, beat or the like. The MIDI part data itself plays MIDI instruments connected to reception terminals as if the player in the concert hall plays them. Since the MIDI part data and sound/image data are all MIDI data, they may be stored by using a MIDI filer (e.g., a standard MIDI file generator) and reproduced at a later time.

Figure 6:
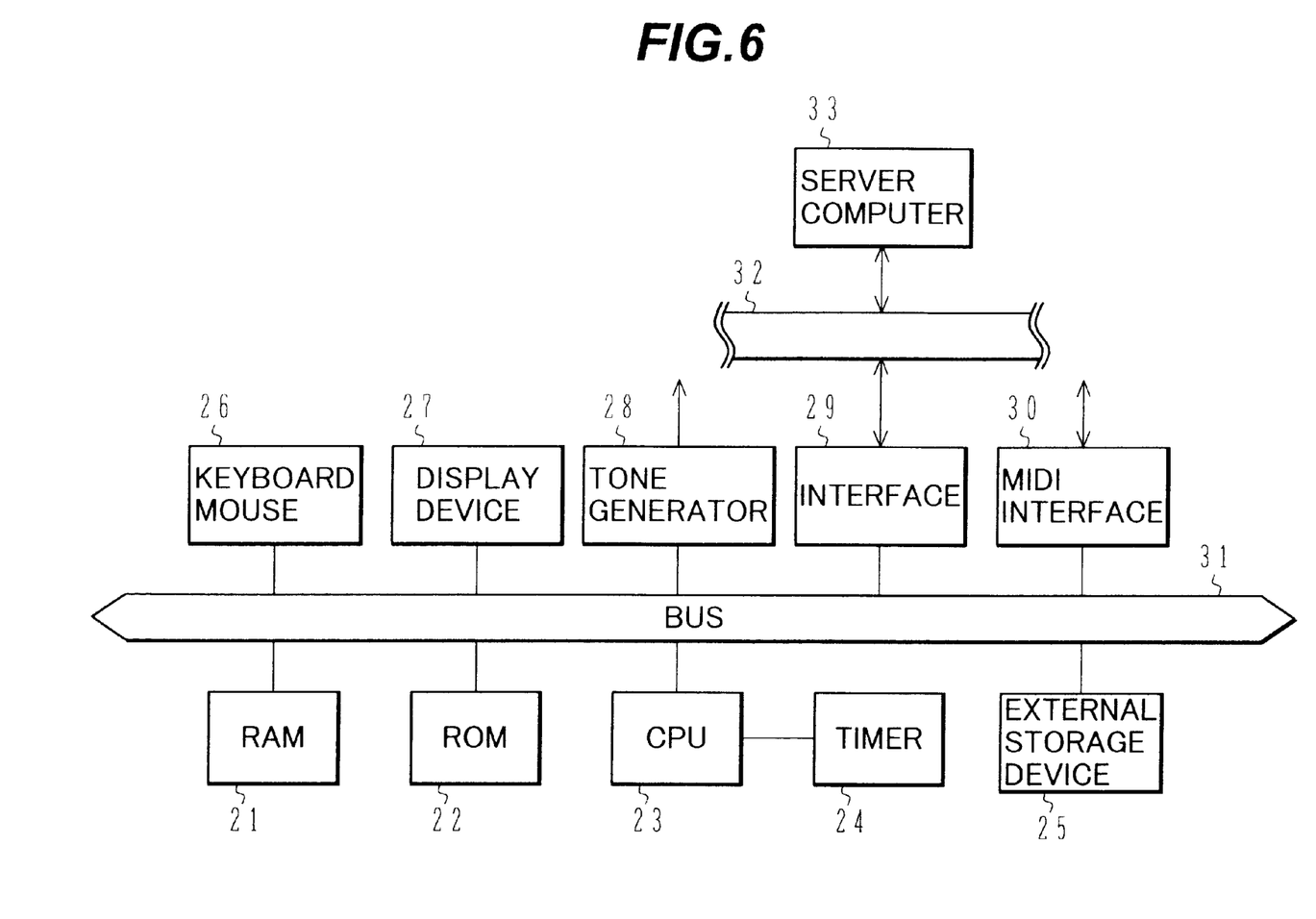
FIG. 6 is a block diagram showing the hardware structure of an encoder and a home computer.

FIG. 6 shows the hardware structure of the encoder 104 and the home computer 131–134 which may be a general computer.

Connected to a bus 31 are an input device 26 such as a keyboard and a mouse, a display device 27, a MIDI tone generator 28, a communications interface 29 for connection to the Internet, a MIDI interface 30, a RAM 21, a ROM 22, a CPU 23, and an external storage device 25.

Various instructions can be entered from the input device 26. In the home computer 131–134, the display device 27 displays each scene of a concert hall, and the MIDI tone generator 28 generates musical tone signals in accordance with received MIDI data and transmits them to an external circuitry.

The communications interface 29 is used for transferring MIDI part data and sound/image data to and from the Internet. The MIDI interface 30 is used for transferring MIDI format data to and from an external circuitry.

The external storage device 25 may be a hard disk drive, a floppy disk drive, a CD-ROM drive, a magneto-optical disk drive or the like and may store therein MIDI part data, sound/image data, computer programs and the like.

ROM 22 may store therein computer programs, various parameters and the like. RAM 21 has buffers for buffering MIDI part data and sound/image data.

RAM 21 has also working areas such as other buffers and registers to copy and store data in ROM 22 or in the external storage device 25. In accordance with computer programs stored in ROM 22 or RAM 21, CPU 23 performs various calculations and signal processing. CPU 23 can fetch timing information from a timer 24.

The external storage device 25 may be a hard disk drive (HDD). HDD 25 may store therein various data such as computer program data and MIDI part data. If a necessary computer program is stored not in ROM 22 but in a hard disk loaded in HDD 25, this program is read into RAM 21 so that CPU 23 can run this computer program in the similar manner as if the program is stored in ROM 22. In this case, addition, version-up and the like of a computer program become easy. The external storage device 25 includes HDD and a CD-ROM (compact-disk-read-only-memory) drive which can read various data such as computer programs stored in a CD-ROM. The read data such as a computer program or other data is stored in a hard disk loaded in HDD. Installation, version-up and the like of a computer program become easy. Other types of drives such as a floppy disk drive, a magneto-optical (MO) disk drive may be used as the external storage device 25.

The communications interface 29 is connected to a communications network 32 such as the Internet, a local area network (LAN) and a telephone line, and via the communications network 32 to a server computer 33. If computer programs and data are not stored in a hard disk loaded in HDD 25, these programs and data can be downloaded from the server computer 33. In this case, a client such as the encoder 104 and home computer 131–134 transmits a command for downloading a computer program or data to the server computer 33 via the communications interface 29 and communications network 32. Upon reception of this command, the server computer 33 supplies the requested application program or data to the encoder 104 or home computer 131–134 via the communications network 32 which receives it via the communications interface 29 and stores it in a hard disk loaded in HDD 25.

This embodiment may be reduced into practice by a commercially available personal computer installed with computer programs and various data realizing the functions of the embodiment. The application programs and various data may be supplied to a user in the form of a storage medium such as a CD-ROM and a floppy disk which the personal computer can read. If the personal computer is connected to the communications network such as the Internet, a LAN and a telephone line, the application programs and various data may be supplied to the personal computer via the communications network.

Figure 2:
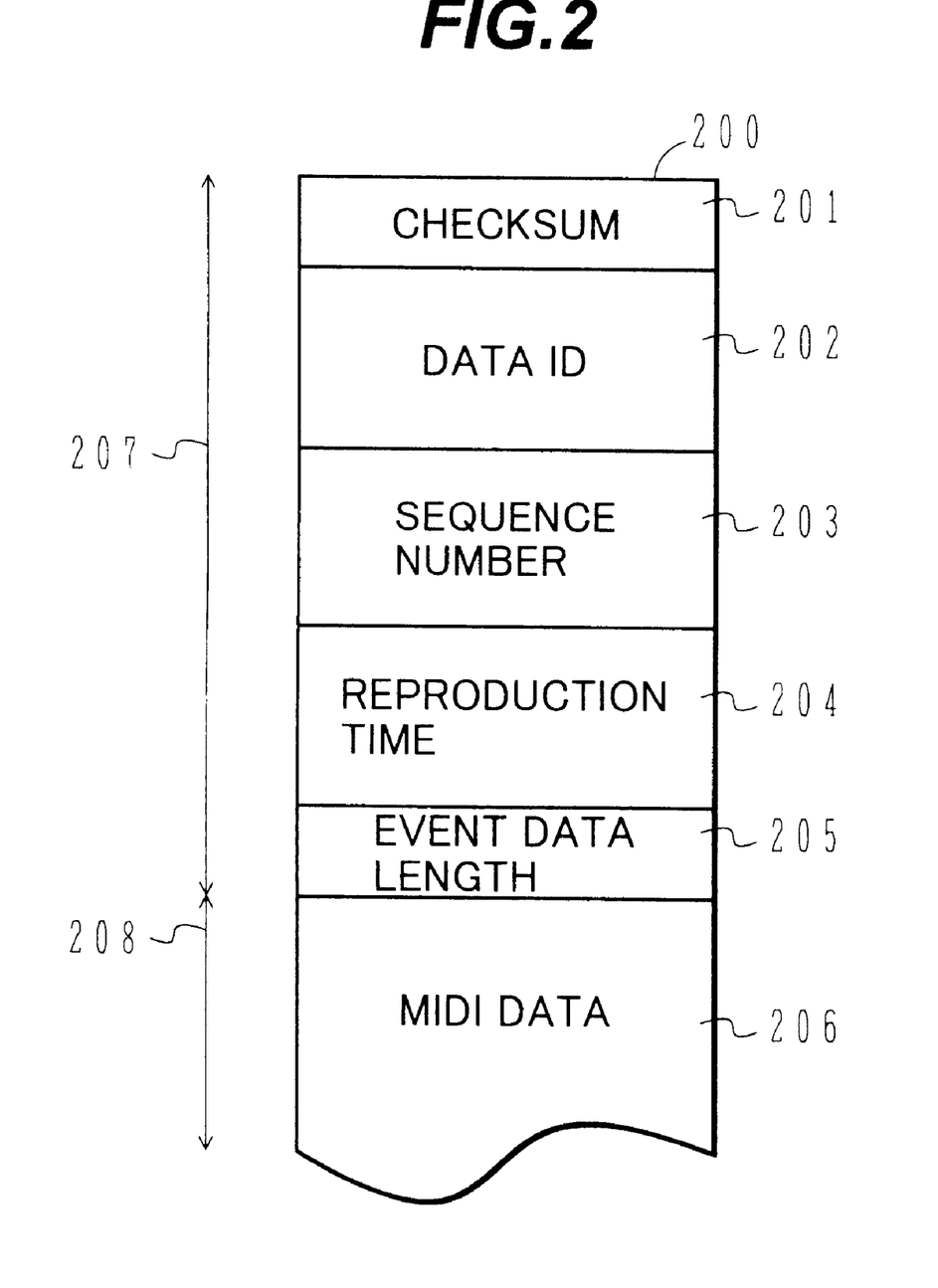
FIG. 2 is a diagram showing the structure of a packet.

FIG. 2 shows the structure of a packet formed by the encoder 104 in accordance with the MIDI part data and sound/image data.

A packet 200 is constituted of a header field 207 and a data field 208. The header field 207 contains checksums 43, a data identifier (ID) 202, a sequence number 203, a reproduction time 204, and an event data length 205. The data field 208 contains MIDI data which is one or a combination of the MIDI part data, image data and sound data. The sound/image is described by exclusive data.

The checksums 201 are representative values of all data in the header field 207 excepting the checksums and in the data field 208. The data ID 202 is an identifier of this packet 200 and includes information representative of each data type. In accordance with this data ID 202, the MIDI part data, image data and sound date are discriminated. The sequence number 203 is a number indicating the reproduction order of this packet 200 and is assigned sequentially to each packet. The reproduction time 204 indicates a time (relative time from the start of musical performance) when the MIDI data 206 in this packet 200 starts being reproduced. The event data length 205 indicates a length of the MIDI data 206. The MIDI data 206 is MIDI real data including the MIDI part data, image data and sound data changed to MIDI events. The MIDI data 206 may contain one of the three MIDI data types or two or all types. If the MIDI data 206 contains two or all types, corresponding data IDs 202 are assigned.

Of the MIDI data 206 in the packet 200, the image data is described by exclusive data (hereinafter called image exclusive data) and represents one event of image data picked up at an interval of a predetermined period (corresponding to a unit time of forming a packet, e.g., about 50 msec). Similarly, the sound data is described by exclusive data (hereinafter called sound exclusive data) and represents one event of image data picked up at the interval of the predetermined period. The MIDI part data 206 of the MIDI data 206 represents a collection of MIDI events of the MIDI instrument 101 which occur during the predetermined period. The MIDI part data contains data not described by exclusive data (hereinafter called performance MIDI data), and if necessary, data described by exclusive data (hereinafter called tone generator exclusive data). The packet 200 has a predetermined format encoded when it is generated for the distribution to the network.

Figure 3:
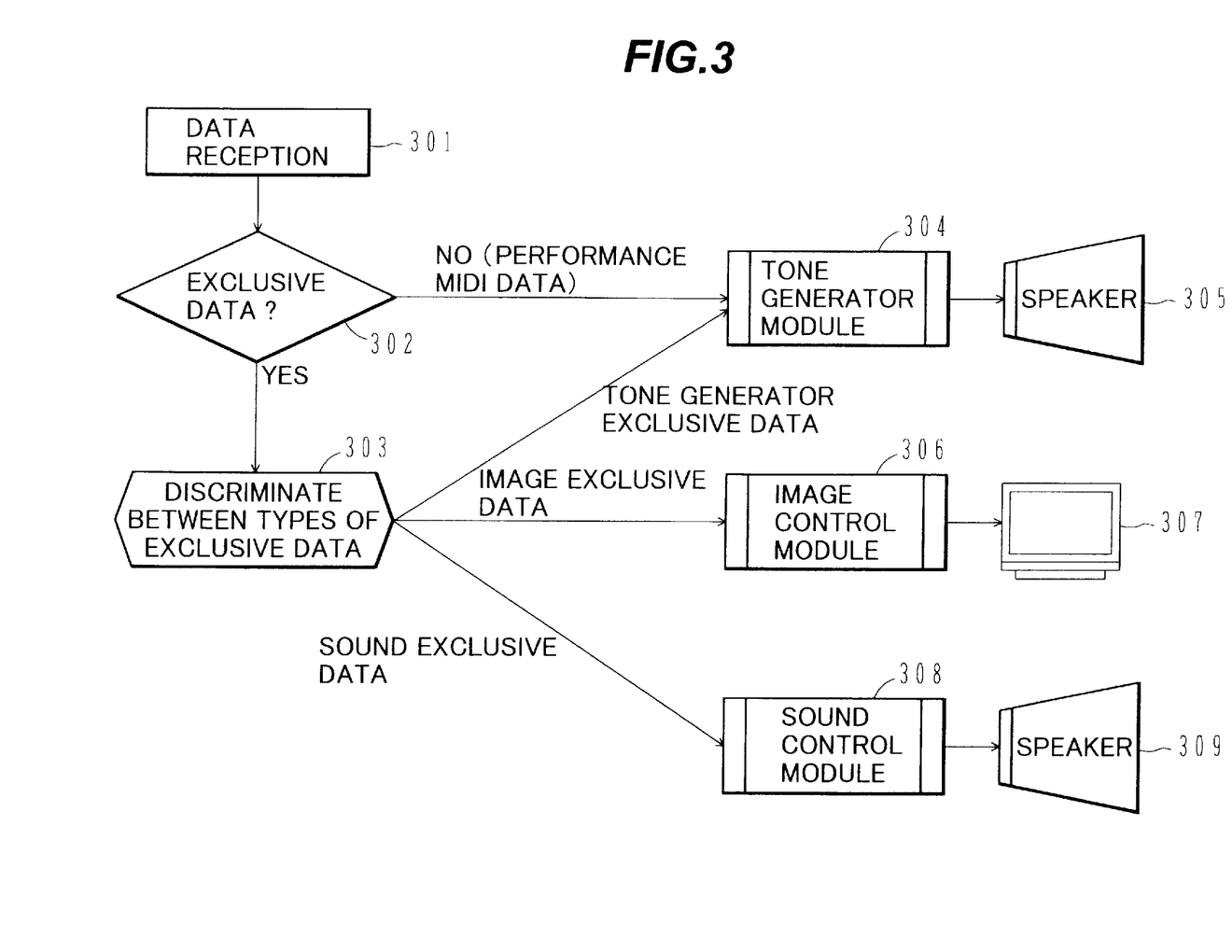
FIG. 3 is a flow chart illustrating a data flow at a reception terminal.

FIG. 3 is a flow chart illustrating a data flow in the home computer (reception terminal) 131–134 shown in FIG. 1. Upon reception of the packet 200 shown in FIG. 2 at Step 301, the reception terminal analyzes the MIDI data 206 in the received packet 200 at Step 302 and following Steps which Steps are repeated for each event in the MIDI data 206 until all events in the MIDI data 206 are processed.

At Step 302 it is checked whether the received data is exclusive data. If not, it means that the received data is the performance MIDI data among the MIDI part data input from the MIDI instrument 101. This performance MIDI data is passed as one event to a MIDI tone generator module 304. If it is judged at Step 302 that the received data is exclusive data, the type of exclusive data is discriminated at Step 303. In accordance with the discriminated type, this event is passed to the MIDI tone generator module 304 if it is the tone generator exclusive data, to an image control module 306 if it is the image exclusive data, and to a sound control module 308 if it is the sound exclusive data.

The tone generator module 304 reproduces the performance MIDI data in the passed MIDI part data (performance MIDI data and/or tone generator exclusive data) and/or sets a tone generator for the tone generator exclusive data, and outputs musical tones from a speaker 305. The image control module 306 decodes the passed image exclusive data to obtain image data of the original format, and displays it on a monitor 307. The sound control module 308 decodes the passed sound exclusive data to obtain sound data of the original format, and outputs it from a speaker 309 which may be the same as the speaker 305. These modules 304, 306 and 308 are of an event driven type that when an event is input, sounds or images are generated in accordance with the passed data. The modules 304, 306 and 308 may be realized by software, hardware or a combination thereof.

Figure 4:
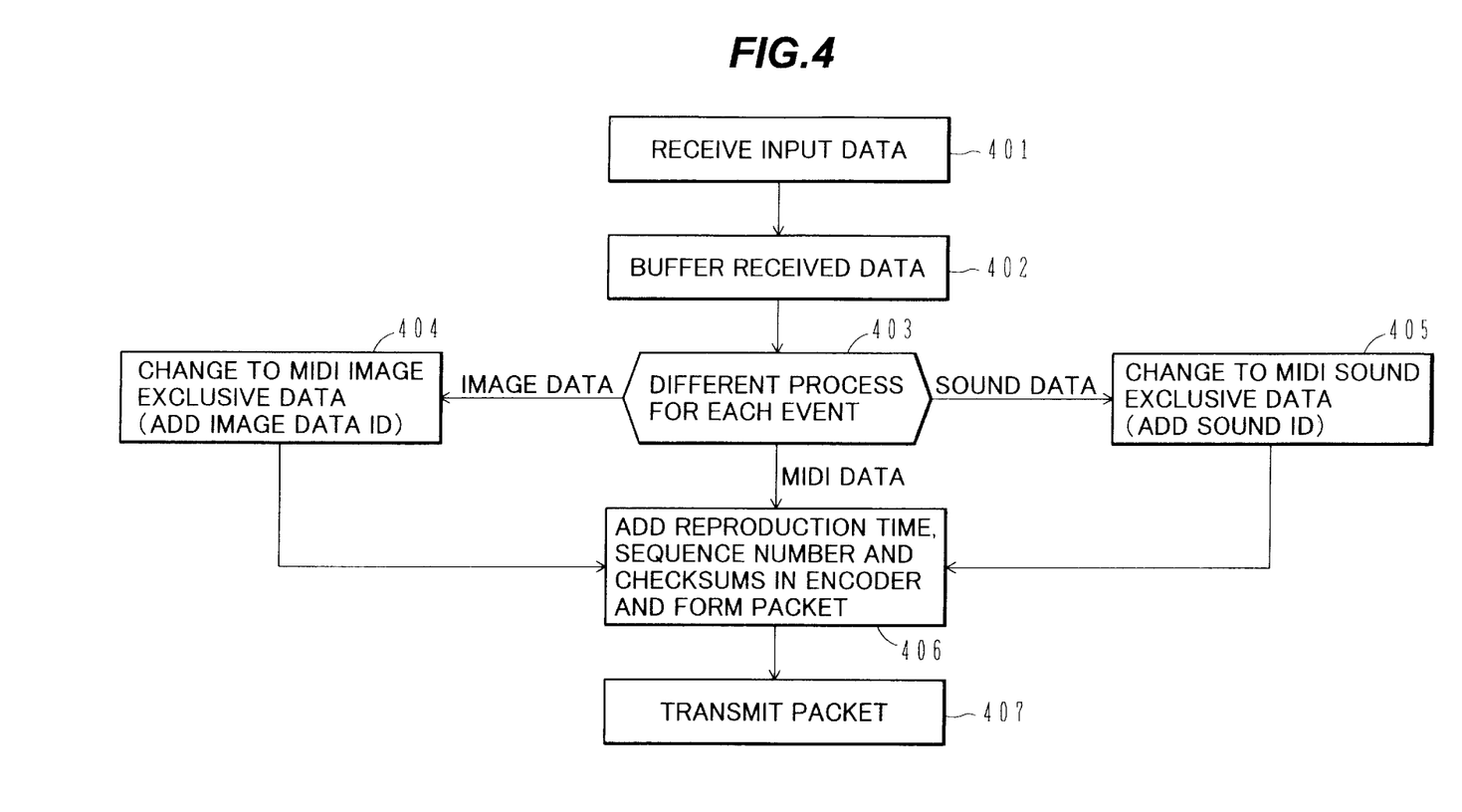
FIG. 4 is a flow chart illustrating an input data processing routine to be executed at a transmission terminal.

FIG. 4 is a flow chart illustrating an input data processing routine to be executed by the encoder (transmission terminal) 104 shown in FIG. 1. This routine is repetitively executed at the interval of the predetermined period (corresponding to a unit time take to form a packet of data). At Step 401 the encoder 104 receives MIDI part data, image data and sound data output from the MIDI instrument 101, camera 102 and sound data pickup unit 103. Next, at Step 402 the received data is buffered in a buffer. At Step 403 the buffered data is picked up and processed differently for each event. If the picked-up data is image data, at Step 404 the image data is changed to have a MIDI exclusive data format, and added with an ID to obtain image exclusive data which is passed to Step 406. If the picked-up data is sound data, at Step 405 the sound data is changed to have a MIDI exclusive data format, and added with an ID to obtain sound exclusive data which is passed to Step 406. If the picked-up data is MIDI part data, it is directly passed to Step 406.

At Step 406 a packet having the format shown in FIG. 2 is formed. A collection of the passed image exclusive data, MIDI part data and sound exclusive data is changed to MIDI data 206. The data ID 202, sequence number 203, reproduction time 204 and event data length 205 are added to the MIDI data 206. Checksums are calculated and added to the MIDI data 206. The MIDI data 206 in the packet may contain one of the image exclusive data, MIDI part data and sound exclusive data or a combination thereof. If the MIDI data 206 contains a combination of these data, corresponding IDs are affixed. The sequence number 203 is set with a value indicating the sequential order of this packet among those packets formed after the start of musical performance. The reproduction time 204 is set with a value indicating a reproduction start time of the MIDI data 206 of this packet, as a relative time from the performance start. The sequence number 203 and reproduction time 204 are managed by the encoder 104. The packet 200 formed at Step 406 is transmitted at Step 407 via the rooter 105 to the main frame 110.

The processes at Steps 403 to 406 are executed separately for each event without being executed as a single path. Namely, since the data buffered at Step 402 contains any one of the image data, MIDI part data and sound data, each event is processed at a path of Step 403 to Step 404 and to Step 406 for the image data, at a path of Step 403 to Step 406 for the MIDI part data, and at a path of Step 403 to Step 405 and to Step 406 for the sound data. All data in the buffer is packeted in a single set of MIDI data 206. One packet may contain three types of data.

Figure 5:
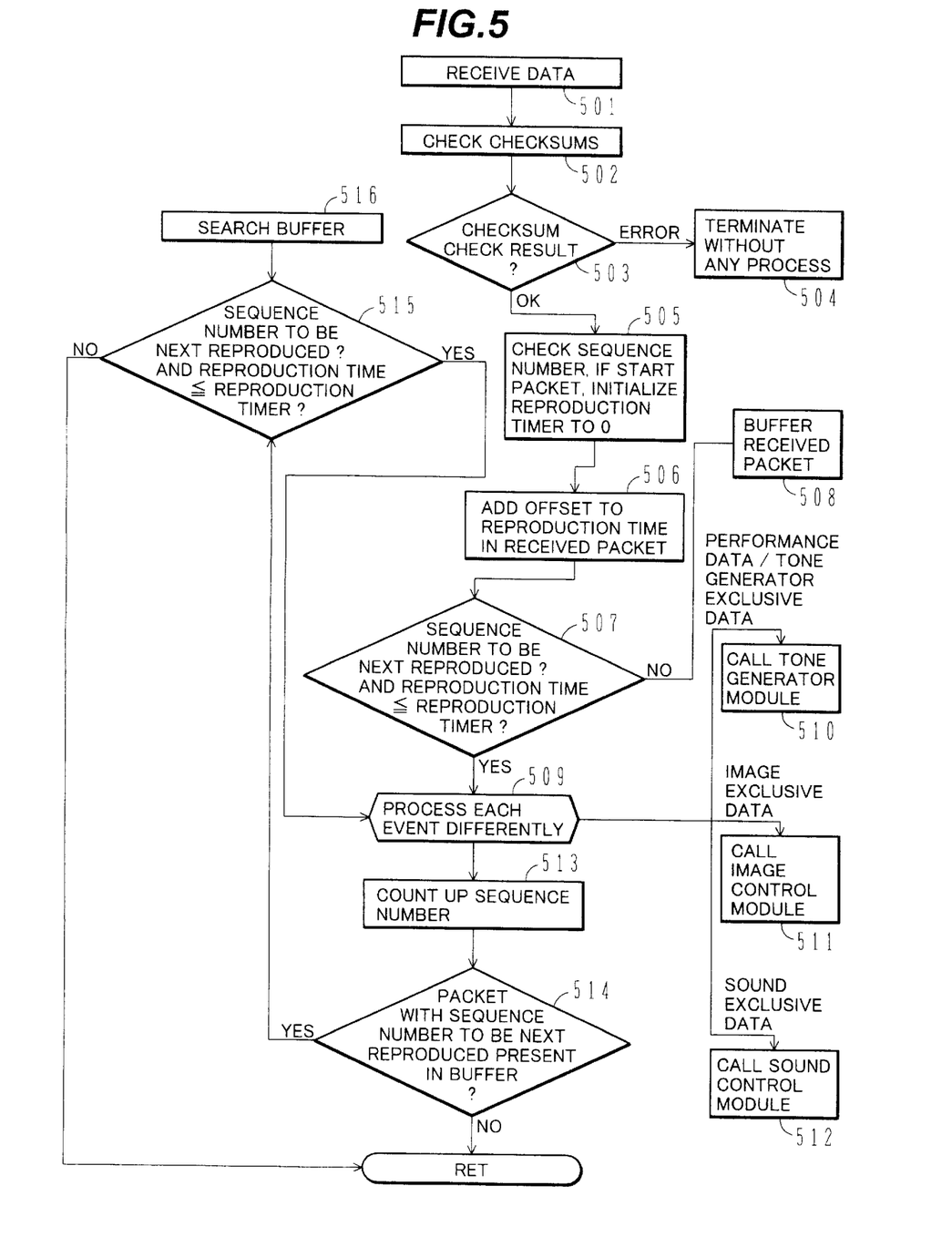
FIG. 5 is a flow chart illustrating a received data processing routine to be executed at a reception terminal.

FIG. 5 is a flow chart illustrating a received data processing routine to be executed at each home computer (reception terminal) 131–134 shown in FIG. 1. This routine is executed each time a packet is received. At Step 501, the reception terminal receives the packet 200 shown in FIG. 2 from the WWW server 121–123 connected thereto. The checksums 201 in the received packet 200 are checked at Step 502 to judge whether thee is any error. If there is a checksum error, the routine is terminated at Step 504 without any further process, or a process suitable for correcting the error may be performed, such as a request for re-transmission of the packet.

If there is no checksum error, the sequence number 203 in the received packet 206 is checked at Step 505. If the received packet is the start packet of musical performance, a reproduction timer is initialized to "0". The reproduction timer is used for counting a lapse time at the reception terminal. Next, at Step 506 a predetermined offset is added to the reproduction time 204 in the received packet 200. This offset is used for delaying the reproduction time at the reception terminal. Specifically, the reproduction start time is delayed by the offset added to the reproduction time 204 in the received packet 200. In an open network such as the Internet, a data transfer rate changes from time to time under various conditions, so that packets are not always received in the order of packet transmission. In this connection, the reproduction time is delayed by the offset time to buffer some packets received during the delayed period and thereafter start the reproduction. During this delayed period, packets of sound/image data are rearranged in order, so that sound/image data can be reproduced without generating noises between consecutive packets.

Next, at Step 507 it is checked whether the received packet has the sequence number to be next reproduced and whether the reproduction time 204 (added with the offset at Step 506) is earlier than the current time of the reproduction timer. If this judgement result is NO, it means that it is still not a time to reproduce the packet. Therefore, at Step 508 the packet is buffered in a buffer.

If the judgement result at Step 507 is YES, it means that it is a time to reproduce the packet. Therefore, Step 510, 511, or 512 is performed for each event in the MIDI data 206 of the packet 200. If the event corresponds to the performance MIDI data or tone generator exclusive data, the tone generator module 304 shown in FIG. 3 is called at Step 510 to output (reproduce) the data. If the event corresponds to the image exclusive data, the image control module 306 is called at Step 511 to output (reproduce) the data. If the event corresponds to the sound exclusive data, the sound control module 308 is called at Step 512 to output (reproduce) the data. The MIDI part data and sound/image data in the MIDI data 206 of the packet can therefore be reproduced or output.

After Step 509, the value of the sequence number managed at the reception terminal is counted up at Step 513. Next, at Step 514 it is checked whether the packet having the sequence number to be next reproduced is present in the buffer. If present, at Step 515 it is checked whether the packet has the sequence number to be next reproduced and whether the reproduction time 204 (added with the offset at Step 506 when the packet is buffered) is earlier than the current time of the reproduction timer. If this judgement result is NO, it means that it is still not a time to reproduce the packet. Therefore, the flow returns to a main routine (to terminate this routine). If the judgement result at Step 515 is YES, it means that it is a time to reproduce the packet. Therefore, the flow advances to Step 509 to repeat the above processes. If the packet having the sequence number to be next reproduced is not present in the buffer at Step 514, the flow returns to the main routine.

In order to reproduce or output the data in the buffered packet, the buffer is searched at Step 516 at an interval of a predetermined period (sufficiently shorter than a packet reception interval). If there is a buffered packet, the flow advances to Step 515 for judging whether the packet is to be reproduced, to thereafter repeat the above processes.

In the above embodiment, although both the image data and sound data are changed to MIDI data, either one of them may be changed to MIDI data. Other data such as words of a song, a player profile, copyright indication, and sponsor advertisement may also be distributed as MIDI data. The data changed to MIDI data and distributed to the network may be stored by using a MIDI filer to be reproduced at a later time.

In the example shown in FIG. 1, the MIDI data is distributed via the rooter 105 and main frame 110 to the Internet. The MIDI data may be directly distributed to the network without using the rooter 105 and main frame 110. The network is not limited only to the Internet, but various types of other networks may also be used.

The present invention has been described in connection with the preferred embodiment. The invention is not limited only to the above embodiment. It is apparent that various modifications, improvements, combinations, and the like can be made by those skilled in the art.

What is claimed is:

1. A communication apparatus comprising:
   first input means for inputting first MIDI data in conformity with a MIDI specification;
   second input means for inputting other data not in conformity with the MIDI specification;
   converting means for converting the other data input from said second input means into second MIDI data in conformity with the MIDI specification; and
   transmitting means for transmitting the first and second MIDI data.

2. A communication apparatus according to claim 1, wherein the other data is sound data or image data.

3. A communication apparatus according to claim 2, further comprising a microphone for generating the sound data and outputting the sound data to said second input means or a camera for generating the image data and outputting the image data to said second input means.

4. A communication apparatus according to claim 1, wherein said converting means converts the other data into the second MIDI data described by exclusive data of the MIDI specification.

5. A communication apparatus according to claim 1, wherein said transmitting means generates a packet including the first and second MIDI data and transmits the packet.

6. A communication apparatus according to claim 1, wherein said transmitting means transmits the first or second MIDI data by adding thereto an identifier for discriminating between the first and second MIDI data.

7. A communication apparatus according to claim 1, wherein said transmitting means transmits the first or second MIDI data by adding thereto a sequence number and time information.

8. A communication apparatus according to claim 1, further comprising: a MIDI instrument for generating the first MIDI data in accordance with performance of a player and outputting the first MIDI data to said first input means.

9. A communication apparatus according to claim 1, wherein said transmitting means forms a packet of the first or second MIDI data at a predetermined time interval, and transmitting the packet to a network.

10. A communication apparatus according to claim 1, further comprising:
   receiving means for receiving the first or second MIDI data;
   first reproducing instructing means for instructing to reproduce the first MIDI data received by said receiving means;
   reverse-converting means for converting the second MIDI data received by said receiving means into the other data; and
   second reproducing instructing means for instructing to reproduce the other data converted by said reverse-converting means.

11. A communication apparatus comprising:
   receiving means for receiving first or second MIDI data in conformity with a MIDI specification; and
   reproduction instructing means for instructing to reproduce the first MIDI data itself received by said receiving means and to reproduce the second MIDI data received by said receiving means by converting the second MIDI data into a reproducible data format.

12. A communication apparatus according to claim 11, wherein said reproduction instructing means instructs to reproduce the second MIDI data by converting the second MIDI data into sound data or image data.

13. A communication apparatus according to claim 12, further comprising a microphone for reproducing the sound data instructed to be reproduced by said reproduction instructing means or a monitor for displaying the image data instructed to be reproduced by said reproduction instructing means.

14. A communication apparatus according to claim 11, wherein the second MIDI data is of an exclusive data format of the MIDI specification.

15. A communication apparatus according to claim 11, wherein said receiving means receives a packet containing the first and second MIDI data.

16. A communication apparatus according to claim 11, wherein said receiving means receives the first or second MIDI data together with an identifier for discriminating between the first and second MIDI data.

17. A communication apparatus according to claim 11, wherein said receiving means receives the first or second MIDI data together with a sequence number and time information.

18. A communication apparatus according to claim 11, further comprising a MIDI tone generator for reproducing the first MIDI data instructed to be reproduced by said reproduction instructing means.

19. A communication apparatus according to claim 11, wherein said receiving means receives the first or second MIDI data of a packet format via a network.

20. A communication apparatus comprising:
   a first input for inputting first MIDI data in conformity with a MIDI specification;
   a second input for inputting other data not in conformity with the MIDI specification;
   a converter for converting the other data input from said second input into second MIDI data in conformity with the MIDI specification; and
   a transmitter for transmitting the first and second MIDI data.

21. A communication apparatus comprising:
   a receiver for receiving first or second MIDI data in conformity with a MIDI specification; and
   a reproduction instructor for instructing to reproduce the first MIDI data itself received by said receiver and to reproduce the second MIDI data received by said receiver by converting the second MIDI data into a reproducible data format.

22. A communication method comprising the steps of:
   (a) inputting first MIDI data in conformity with a MIDI specification;
   (b) inputting other data not in conformity with the MIDI specification;
   (c) converting the other data input at said step (b) into second MIDI data in conformity with the MIDI specification; and
   (d) transmitting the first and second MIDI data.

23. A communication method comprising the steps of:
   (a) receiving first or second MIDI data in conformity with a MIDI specification; and
   (b) instructing to reproduce the first MIDI data itself received at said step (a) to reproduce the second MIDI data received at said step (a) by converting the second MIDI data into a reproducible data format.

24. A storage medium storing a program to be executed by a computer, the program comprising the steps of:
   (a) inputting first MIDI data in conformity with a MIDI specification;
   (b) inputting other data not in conformity with the MIDI specification;
   (c) converting the other data input at said step (b) into second MIDI data in conformity with the MIDI specification; and
   (d) transmitting the first and second MIDI data.

25. A storage medium storing a program to be executed by a computer, the program comprising the steps of:
   (a) receiving first or second MIDI data in conformity with a MIDI specification; and
   (b) instructing to reproduce the first MIDI data itself received at said step (a) to reproduce the second MIDI data received at said step (a) by converting the second MIDI data into a reproducible data format.

* * * * *